United States Patent [19]

Sano et al.

[11] Patent Number: 4,875,443
[45] Date of Patent: Oct. 24, 1989

[54] START CONTROL SYSTEM FOR INTERNAL COMBUSTION ENGINE

[75] Inventors: Ryuichi Sano, Oobu; Shigenori Isomura, Kariya, both of Japan

[73] Assignee: Nippondenso Co., Ltd., Kariya, Japan

[21] Appl. No.: 154,373

[22] Filed: Feb. 10, 1988

[30] Foreign Application Priority Data

Feb. 17, 1987 [JP] Japan ................................ 62-34239

[51] Int. Cl.$^4$ ............................................ F02D 41/06
[52] U.S. Cl. ............................ 123/179 G; 123/179 L; 123/491
[58] Field of Search ........... 123/179 L, 179 G, 180 E, 123/187.5 R, 491

[56] References Cited

U.S. PATENT DOCUMENTS

| | | | |
|---|---|---|---|
| 4,134,368 | 1/1979 | Hadley | 123/491 |
| 4,148,282 | 4/1979 | Grassle et al. | 123/491 |
| 4,250,849 | 2/1981 | Takase | 123/179 L |
| 4,344,392 | 8/1982 | Iijima et al. | 123/179 G |
| 4,590,563 | 5/1986 | Matsumura et al. | 364/431.05 |

FOREIGN PATENT DOCUMENTS 57-335 1/1982 Japan .

OTHER PUBLICATIONS

Patent Abstracts of Japan, vol. 7, No. 169 (M-231) [1314], Jul. 26, 1983; & JP-A-No. 58-74838.
Patent Abstracts of Japan, vol. 8, No. 104 (M-296) [1541], May 16, 1984; & JP-A-No. 59-15641.
Patent Abstracts of Japan, vol. 10, No. 242 (M-509) [2298], Aug. 21, 1986; & JP-A-No. 61-72855.

Primary Examiner—Andrew M. Dolinar
Attorney, Agent, or Firm—Cushman, Darby & Cushman

[57] ABSTRACT

In fuel injection system of an internal combustion engine of a vehicle, a fuel injection valve is activated to inject pre-start fuel in response to turn-on of a main switch by a vehicle driver. A starter motor is not activated until a predetermined delay period ($T_D$) elapses after the turn-on of the main switch. During the delay period ($T_D$) the injected fuel is vaporized. After the delay period ($T_D$) the vaporized fuel is taken into engine cylinders when the engine is cranked by the starter motor so that fuel is ignited in the engine easily.

7 Claims, 5 Drawing Sheets

START CONTROL SYSTEM FOR INTERNAL COMBUSTION ENGINE

BACKGROUND OF THE INVENTION

The present invention relates to a start control system for an internal combustion engine of a vehicle, and more particularly to a start control system for a fuel injection type internal combustion engine of a vehicle.

One start control system of a fuel injection type internal combustion engine is disclosed in, for example, Japanese Patent Laid-Open No. 335/1982. In this start control system, the relationship between the temperature of an engine when started and required fuel injection period of time is previously stored, and when a main switch of an engine is switched on to an ignition position, an injection valve is driven for the fuel injection period of time which corresponds to the temperature of the engine for the purpose of supplying a predetermined quantity of fuel so as to start the engine.

However, in the structure disclosed above, if a driver quickly actuates the main switch to a starter position, a starter motor is driven at substantially the same time as the fuel injection. Therefore the fuel is taken into engine cylinders in less vaporaized condition and the preparation of relatively rich mixture needed for starting the engine delays, as a result of which, engine starting becomes defective. That is, adequate improvement in starting performance of the engine has not been achieved yet.

SUMMARY OF THE INVENTION

It is therefore an object of the present invention to provide a start control system for an internal combustion engine in which even if a driver quickly actuates a main switch, the internal combustion engine can be started preferably.

It is a further object on the invention to provide a start control system in which a pre-start fuel injection is initiated in response to turn-on of a main switch and driving a starter motor is forcibly delayed relative to the turn-on of the main switch.

It is a still further object of the present invention to provide a start control system in which amount of pre-start fuel injection is decreased as the number of failure of starting engine increases.

According to the present invention, pre-start fuel is injected in response to a command of initiation of engine operation but a starter motor is prevented forcibly from being driven to crank an engine for a moment. The injected fuel is vaporized while the starter motor is kept stopped, and then the vaporized fuel is taken into cylinders of the engine when the starter motor is driven to crank the engine. This vaporized fuel is easy to be ignited upon actual starting of the engine.

DETAILED DESCRIPTION OF THE PREFERRED EMBODIMENT

Referring to the accompanying drawings, an embodiment of the present invention will now be described.

Figure 1:
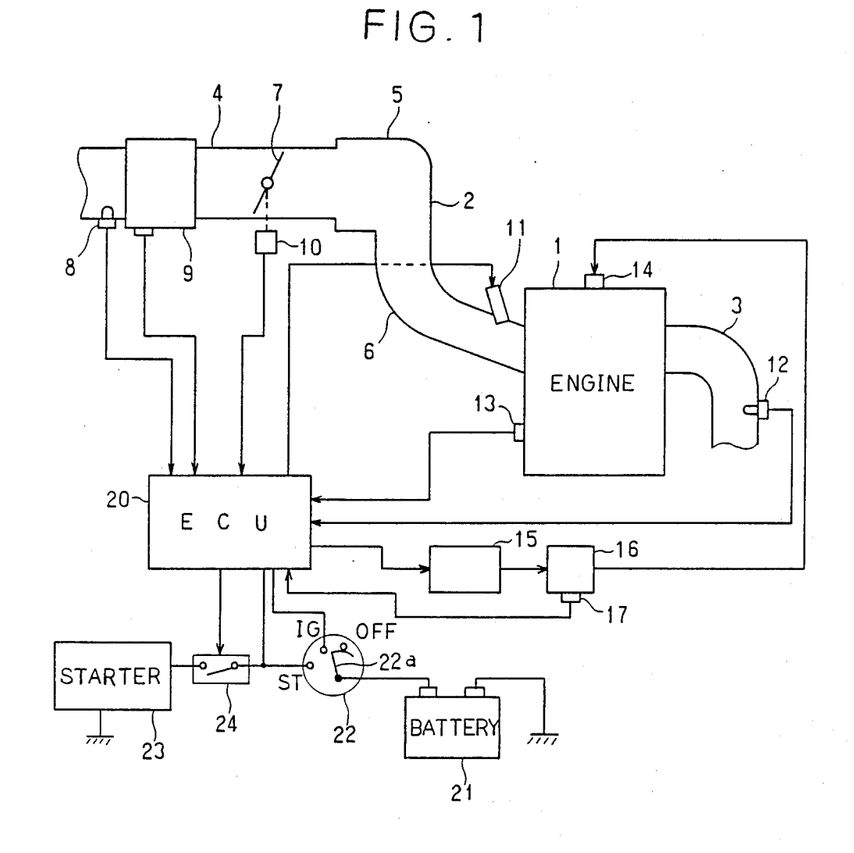
FIG. 1 is a schematic view illustrating the structure of an internal combustion engine to which the present invention is applied.

In FIG. 1, an intake pipe 2 and an exhaust pipe 3 are connected to an engine 1 of a vehicle. The intake pipe 2 comprises, as seen from the upstream side, a main portion 4, a surge tank 5, and a branched portion 6. Intake air which has passed through the main portion 4 is introduced into the surge tank 5 and then introduced into each of cylinders of the engine 1 through the branched portion 6. The exhaust pipe 3 comprises a branched portion corresponding to the cylinders and a main portion which collects the branched portions. A throttle valve 7 which is operated by a vehicle driver is provided in the main portion 4 of the intake pipe 2.

The upper stream of the throttle valve 7 is provided with an intake air temperature sensor 8 for generating a signal corresponding to intake air temperature and an intake air amount sensor 9 for generating a signal corresponding to the amount of intake air. A rotational shaft of the throttle valve 7 is provided with a throttle sensor 10 for generating a signal corresponding to the degree of opening of the throttle valve 7. Each of the branched portions 6 has an electromagnetically-operated fuel injection valves 11. Fuel is injected from the fuel injection valves 11 into the engine 1. The exhaust pipe 3 is provided with an oxygen sensor 12 for generating a signal corresponding to residual oxygen density contained in an exhaust gas. The engine 1 is provided with coolant temperature sensor 13 for generating a signal corresponding to the temperature of the coolant for cooling the engine 1. Spark plugs 14 are provided for the corresponding cylinders of the engine 1. High potential voltage generated by an igniter 15 is supplied to the spark plugs 15 via a distributor 16. The distributor 16 is provided with a rotational speed sensor 17 for generating a signal corresponding to the rotational speed of the engine 1.

The signals from the above sensors are arranged to be supplied to an electronic control unit (ECU) 20 which primarily comprises a microcomputer. The ECU 20 conducts various calculations in accordance with the input signals for the purpose of controlling the fuel injection valve 11 and the igniter 15 and so on. The ECU 20 is connected to a storage battery 21 mounted on a vehicle through a main switch 22 which is arranged to be operated by the vehicle driver. A movable contact 22a of the main switch 22 is brought into contact with an IG (ignition) position of the switch 22 by way of being rotated counterclockwise through a predetermined angle by the driver, whereby electricity is supplied from the battery 21 to the ECU 20. Furthermore, by further rotating counterclockwise the movable contact 22a by the driver, the movable contact 22a comes into contact with both the IG terminal and ST (starter) position. The ST position is directly connected to the ECU 20 but indirectly connected to a starter motor 23 via a relay 24. The relay 24 is opened or closed under the control of the ECU 20.

Figure 2:
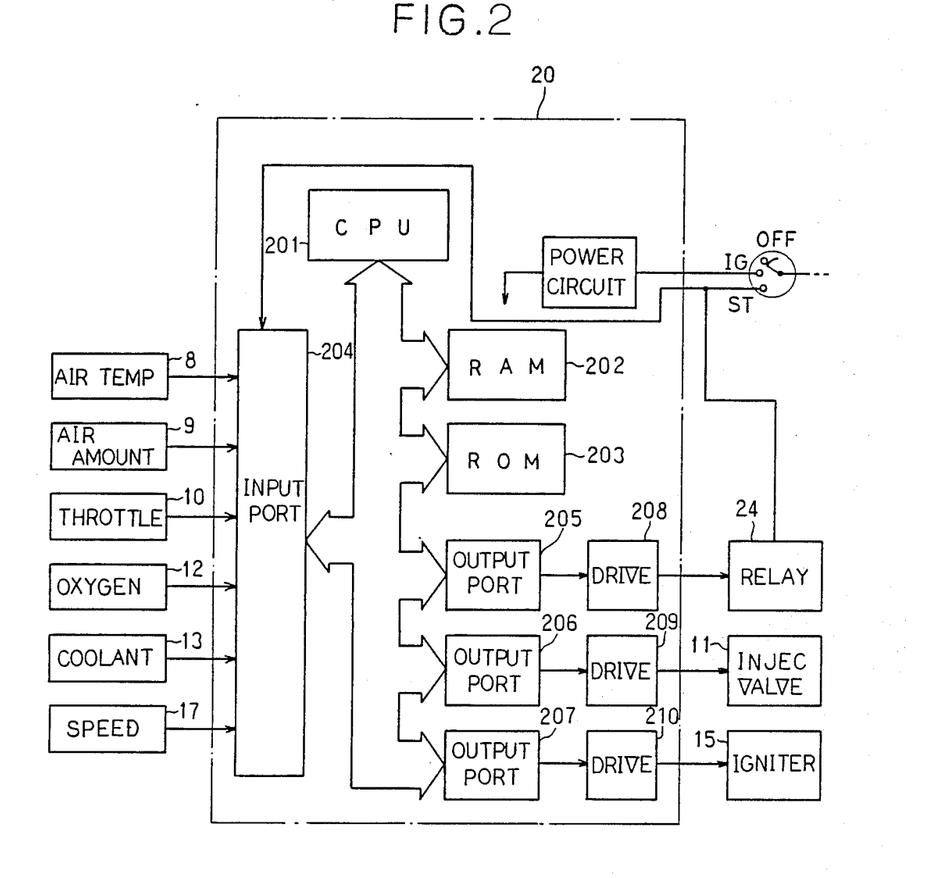
FIG. 2 is a block diagram illustrating the structure of ECU shown in FIG. 1.

FIG. 2 illustrates the structure of the ECU 20. In FIG. 2, reference numeral 201 represents a central processing unit (CPU) which conducts various calculations for the purpose of controlling fuel injection amount, ignition timing and actuation of the relay 24 in accordance with various input data items and giving various commands. Reference numeral 202 represents a random access memory (RAM) in which input data for use in the CPU 201 and output data from the CPU 201 after calculations or the like are temporarily stored. Reference numeral 203 represents a read only memory (ROM) in which fixed data and control program needed for calculation by the CPU 201 are stored. Reference numeral 204 represents an input port through which the following signals are input: signals from the intake air temperature sensor 8, intake air amount sensor 9, throttle sensor 10, oxygen sensor 12, coolant temperature sensor 13, rotational speed sensor 17, and a signal indicating that the movable contact 22a of the main switch 22 is operated to come into contact with the ST position by the driver, that is, a signal indicating a command to start the engine 2 from the driver. Reference numerals 205, 206 and 207 represent output ports for the relay 24, fuel injection valves 11 and the igniter 15, respectively. Through these output ports 205, 206 and 207 the signals which correspond to the result of calculation by the CPU 201, and which have been converted by the corresponding driving circuits 208, 209 and 210 in response to the command from the CPU 201 into predetermined signals are output to the relay 24, fuel injection valve 11 and the igniter 15.

The operation of the above-described embodiment will now be described in accordance with flow charts of FIGS. 3 and 5.

Figure 3:
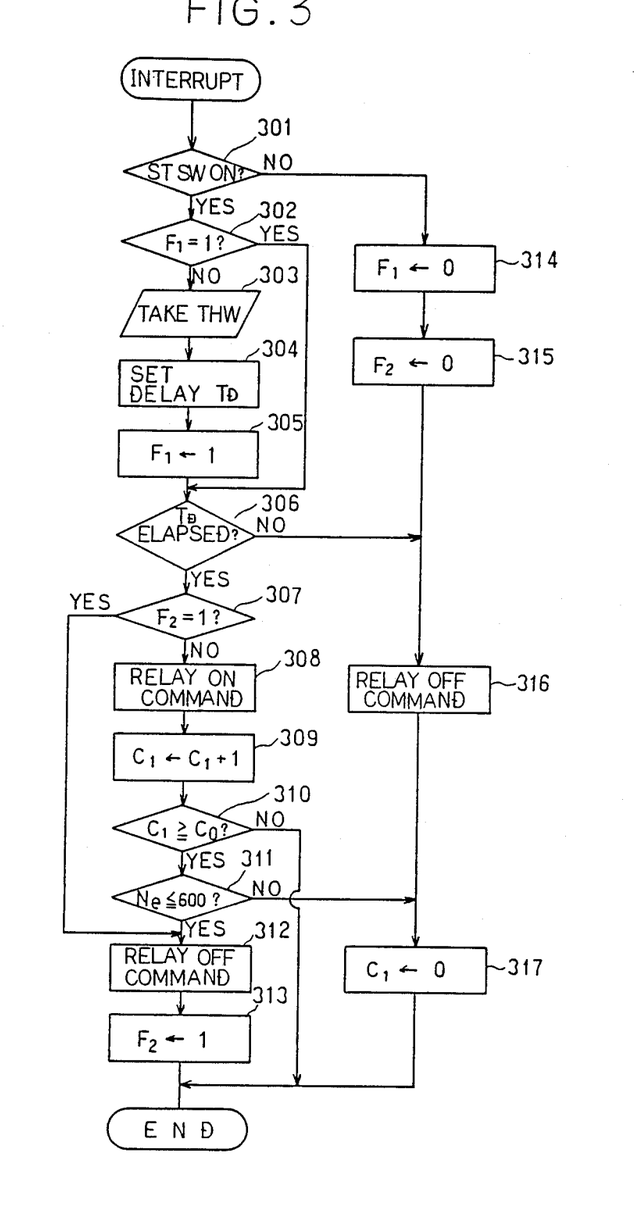
FIGS. 3 and 5 illustrate flow charts of programs executed by the CPU shown in FIG. 2.

FIG. 3 shows a flow chart of a program which is executed every 10 msec as an interrupt routine. As shown in FIG. 3, it is discriminated first in step 301 whether the movable contact 22a of the main switch 22 is positioned in contact with the ST position. It is therefore discriminated in step 301 whether the signal indicating start command for the engine 1 rom the driver is generated.

Figure 4:
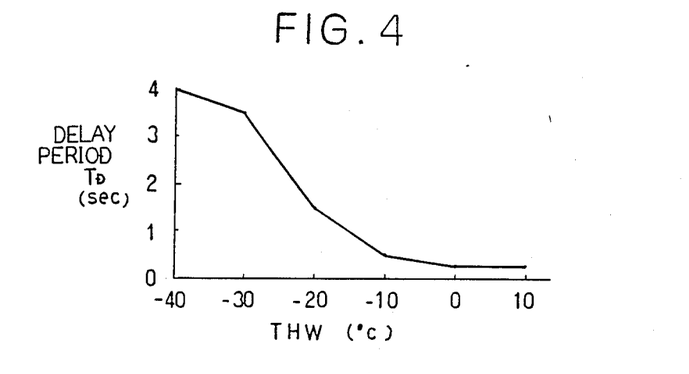
FIG. 4 is a table for use in setting a delay period obtained by the program shown in FIG. 3.

If it is discriminated in step 301 that the main switch 22 is turned on to the ST position, it is discriminated in step 302 whether a first flag $F_1$ indicating a set or unset condition of a delay period $T_D$ described later is 1. If it is discriminated not to be 1 or not yet set, the current coolant temperature THW is, in step 303, taken in. It is to be understood here that the delay period $T_D$ means a period in which operation of the starter motor 23 is prevented after the turn-on of the main switch 22 to the ST position so that injected fuel is not taken into the engine cylinders until vaporized. In step 304, the delay period $T_D$ corresponding to the coolant temperature THW is read from a table which has been previously stored in ROM 203, and which is set as shown in FIG. 4, and this delay period $T_D$ is set as the current delay period. In step 305, the flag $F_1$ is set to 1 indicating completion of setting the delay period $T_D$, and in step 306 it is discriminated whether the delay period $T_D$ set in step 304 has been elapsed. The delay period $T_D$ is predetermined so that, as shown in FIG. 4, when the coolant temperature THW becomes low, it becomes longer. For example, if water temperature THW is as low as $-30°$ C., the delay period $T_D$ is set to as long as 3.5 seconds. The delay period $T_D$ becomes longer as the temperature THW is low, because fuel vaporization requires longer time under low temperature condition. Meanwhile the program is arranged to be as such that if the first flag $F_1$ is discriminated to be 1 in step 302, the flow advances to step 306 bypassing steps 303, 304 and 305.

In step 306, if it is discriminated that the delay period $T_D$ has been elapsed, it is discriminated in step 307 whether a second flag $F_2$ indicating a failure of engine start is 1. If it is discriminated not to be 1 or not yet failed, a command to turn on the relay 24 is given to the output port 205 in step 308 so that the starter motor 23 is now energized. Then, in step 309, 1 is added to a first counter $C_1$ which counts time elapsing after the command to turn on the relay 24 or operation of the starter motor 23 and the flow advances to step 310. In step 310, it is discriminated whether the counter $C_1$ exceeds a predetermined value $C_o$ for example 500, that is, the value corresponds to five seconds). If $C_1 < C_o$ indicating that the starter motor 23 is kept energized less than 5 seconds, the routine is completed and the starter motor 23 is kept energized. While if $C_1 \geq C_o$ indicating that the starter motor 23 is kept energized more than 5 seconds, the flow advances to step 311. In step 311, it is discriminated whether rotational speed Ne is lower than 600 rpm. If it is discriminated to be lower than 600 rpm, the flow advances to step 312 in which the relay 24 is turned off to stop operation of the starter motor 23. Then, in step 313, the second flag $F_2$ is set to 1 which indicates a failure of engine starting operation, and the routine is completed.

Meanwhile, if it is discriminated in step 301 that the main switch 22 is not turned on to ST position, the first flag $F_1$ and the second flag $F_2$ are cleared to 0 in the corresponding steps 314 and 315. Then, in step 316, a command to turn off the relay 24 is given to the output port 205. In step 317, the first counter $C_1$ is cleared to 0, and the routine is completed. If it is discriminated in step 306 that the delay period $T_D$ has not been elapsed, the routine is completed after the processes in steps 316 and 317 have been executed. If it is discriminated in step 311 that the rotational speed Ne exceeds 600 rpm, the routine is completed after the process in step 317 has been executed.

Figure 5:
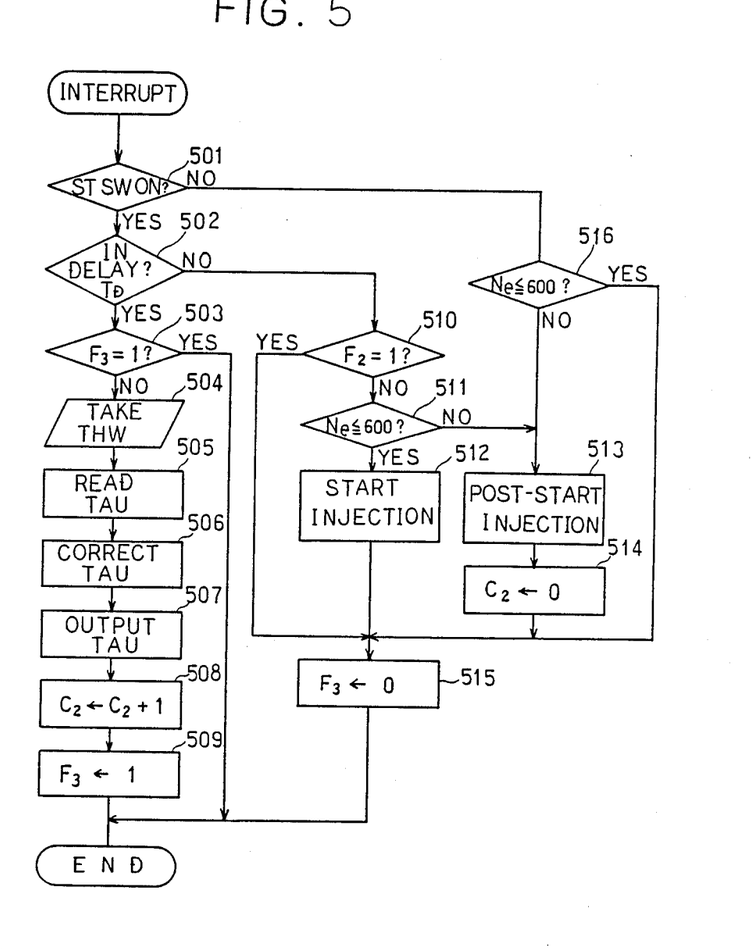
Figure 6:
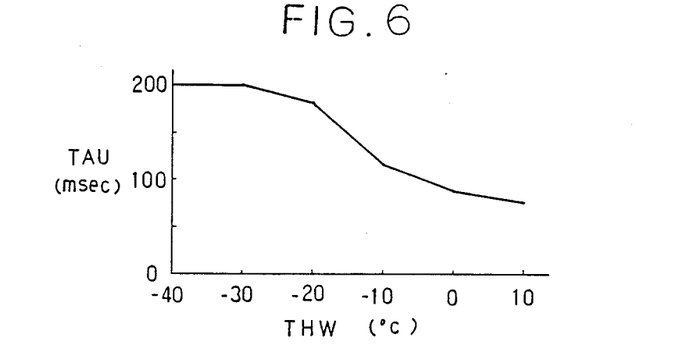
FIG. 6 is a table for use in setting pre-start fuel injection time period TAU obtained by the program shown in FIG. 5.
Figure 7:
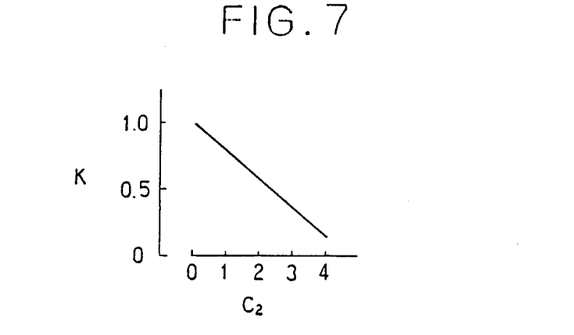
FIG. 7 is a table for use in setting correction coefficient K for use in the program shown in FIG. 5.

FIG. 5 illustrates a flow chart of a program which is executed every 10 msec as interrupt routine in the similar manner to that shown in FIG. 3. As shown in FIG. 5, in step 501, a similar process as that executed in step 301 of the program shown in FIG. 3 is executed. If the main switch 22 is turned on to ST position, the flow advances to step 502 in which it is discriminated whether it is during the delay period $T_D$. If it is discriminated that it is in the midst of the delay period, it is discriminated in step 503 whether the second flag $F_3$ indicating status of pre-start fuel injection is 1. If it is not 1 or no pre-start fuel injection has been completed yet, the flow advances to step 504 in which current coolant temperature THW is taken. In step 505, pre-start fuel injection time period TAU which corresponds to the coolant temperature THW is read from a table which has been previously stored in the ROM 203, and which is set as shown in FIG. 6. In step 506, the fuel injection time period TAU is corrected with correction coefficient K as shown in FIG. 7 which corresponds to a second counter $C_2$ showing the number of the pre-start fuel injections performed previously until the starting is completed. A table showing the relationship between the second counter $C_2$ and the correction coefficient K is also previously stored in the ROM 203. In step 507, a command to operate the injection valve 11 in accordance with the obtained fuel injection time period TAU is given to the output port 206. In step 508, the second counter $C_2$ is incremented by one, and 1 is set to the third flag $F_3$ in step 509, and this routine is completed. Meanwhile, if it is discriminated that the third flag $F_3$ is 1 in step 503, this routine is completed bypassing all of the succeeding steps.

If it is discriminated in step 502 that it is not during the delay period $T_D$ or delay period $T_D$ has already elapsed, it is discriminated in step 510 whether the second flag $F_2$ of the program shown in FIG. 3 is 1 indicative of failure of engine starting operation. If it is not 1 or engine starting operation is not in failure, the flow advances to step 511 in which it is discriminated whether the current rotational speed Ne is lower than 600 rpm. If Ne $\leq$ 600 rpm, the flow advances to step 512, while if Ne > 600 rpm indicating completion of starting operation, the flow advances to step 513. In step 512, fuel injection time period is determined depending on the processes for injection during start, for example, coolant temperature THW and intake air temperature THA. In step 513, basic fuel injection time period is determined depending upon processes for injection at start, for example, amount of intake air Q and rotational speed Ne. The basic fuel injection time period is corrected with correction coefficient obtained from the relationships between intake air temperature THA, the degree of opening of the throttle valve 7 and coolant temperature THW, and air-fuel ratio correction coefficient obtained from output from the oxygen sensor 12. The obtained fuel injection time period is output to the output port 206 in the other routine which is synchronized with rotation. After completion of the process in step 513, the second counter $C_2$ is cleared to 0 in step 514. If it is discriminated in step 510 that $F_2=1$, or after the step 512 has been processed, or after the step 514 has been processed, the flow advances to step 515 wherein the third flag $F_3$ is cleared to 0, and the routine is completed.

If it is discriminated that the main switch 22 is not turned on to ST position in step 501, the flow advances to step 516 wherein it is discriminated whether the current rotational speed Ne is lower than 600 rpm. If Ne $\leq$ 600 rpm, the routine is completed after processing step 515. If Ne > 600 rpm, the routine is completed after execution of steps 513, 514 and 515.

According to the above mentioned structure and the program shown in FIGS. 3 and 5, when the main switch 22 is operated by the driver to turn on the main switch 22 to IG position, the ECU 20 becomes operative, whereby the aforementioned program is executed. When the main switch is turned on to IG position but not turned on to ST position, only the processes in steps 314, 315, and 316 and 317 are executed. That is, both the first flag $F_1$ and the second flag $F_2$ are set to 0, whereby the relay 24 is turned off, that is, supply of electricity to the starter motor 23 is prevented. Furthermore, the first counter $C_1$ is set to 0. In the interrupt routine shown in FIG. 5, only the process in step 516 is executed, but the engine 1 has not been started causing Ne 600 rpm, whereby the third flag $F_3$ is set to 0 in step 515.

When the main switch 22 is further operated by the driver to the ST position, the flow advances to step 303 because the first flag $F_1$ has been set to 0 previously. In step 303, coolant temperature THW is taken, and in step 304, delay period $T_D$ corresponding to the coolant temperature THW is set and the first flag $F_1$ is set to 1, and the flow advances to step 306. If the delay period $T_D$ has not been elapsed, the flow advances to step 316 in which the relay 24 is maintained off and the starter motor 23 is not energized yet. Once the delay period $T_D$ is set, the first flag $F_1$ is set to 1. As a result of this, provided that the first flag $F_1$ is not reset to 0, the delay period $T_D$ is not reset. According to FIG. 5, since the delay period $T_D$ has already been set, the flow advances to step 503. In this state, since the third flag is $F_3=0$, the processes in steps 504 to 509 are executed. That is, pre-start fuel injection time period TAU corresponding to the current coolant temperature THW is set immediately after the delay period $T_D$ has been set and the second counter $C_2$ is 0 in this state, the fuel injection time period TAU is output without any correction. Then, 1 is added to the second counter $C_2$, whereby 1 is set to the third flag $F_3$. Although the interrupt routine shown in FIG. 5 is executed repeatedly during the delay period $T_D$, the processes of steps 504 to 509 are not executed since the third flag $F_3$ is set to 1 indicating the completion of pre-start fuel injection. Therefore, fuel injection executed during the pre-start delay period $T_D$ is limited to only once immediately after setting the delay period $T_D$.

If the delay period $T_D$ has been elapsed with the main switch 22 remained turned on to ST position by the driver, the flow advances to step 307 through steps 301, 302 and 306. In this state, since the second flag is $F_2=0$ initially, the flow advances to step 308 in which a command to turn on the relay 24 is given to the output 205 so that the starter motor 23 is turned on, whereby 1 is added to the first counter $C_1$. In step 310, a comparison with a predetermined value $C_0$ is made. Since $C_1 < C_2$ in this state, the interrupt routine is completed. Although this interrupt routine is executed, the above sequential processes are executed whenever interruptions are made if it is not $C_1 \geq C_0$ the starter motor 23 is not kept turned on too long. Therefore, electricity supply to the starter motor 23 is continued causing the starter 23 to be continuously driven. As shown in FIG. 5, since it is the state after the delay period $T_D$ has been elapsed, the flow advances to step 510. In this state, since $F_2 = 0$ indicating that the relay 24 is kept turned on, it is discriminated in step 511 whether the current rotational speed is Ne $\leq$ 600 rpm. If Ne $\leq$ 600 rpm, it is discriminated to be a starting state in which the engine is cranked by the starter motor 23. Therefore, fuel injection process for starting state is executed in step 512, and the third flag $F_3$ is set to 0. If Ne > 600 rpm, it is discriminated that starting the engine has been completed, and the flow advances to step 513 wherein the post-start fuel injection process is executed, and the second counter $C_2$ is cleared to 0, whereby the third flag $F_3$ is reset.

As described above, when the main switch 22 is only once turned on to the ST position by the driver causing the engine start to be completed before the first counter $C_2$ exceeds $C_0$, and the main switch is turned off, the processes of steps 310, 314, 315, 316 and 317 shown in FIG. 3, and processes of steps 501, 516, 513, 514 and 515 shown in FIG. 5 are executed.

On the other hand, if the first operation of turning on to the ST position is continued until the first counter $C_1$ exceeds $C_0$, and the rotational speed is Ne $\leq$ 600 rpm in this state, the flow advances to step 312 in FIG. 3. In this state, although the main switch is turned on to ST position by the driver, a command to turn off of the relay 24 in a forced manner is output to the output port 205, whereby the relay 24 is turned off in response to this output. As a result of this, electricity supply to the starter motor 23 is prevented, whereby the starter 23 is stopped, and 1 is set in the second flag $F_2$. Although the main switch 22 is maintained on to the ST position by the driver, the processes of steps 301, 302, 306, 307, 312 and 313 are executed in a repeated manner, and step 308 is bypassed since 1 is set in the second flag $F_2$. As a result of this, the starter 23 is maintained stopped. According to FIG. 5, although the flow advances steps 510, 502 and 510, no succeeding processes is executed since the second flag $F_2$ is set to 1 in this state. As a result of this, any excessive fuel injection is not conducted, whereby defects in ignition due to adhesion of fuel to the spark plug 14 can be effectively prevented.

Then, if the main switch 22 is turned off by the driver, the processes of steps 310, 314, 315, 316 and 317 shown in FIG. 3 are executed. Therefore, the first and second flags $F_1$ and $F_2$ are reset to 0 furthermore, the first counter $C_1$ is cleared to 0. In FIG. 5, the flow advances from step 501 to 516, and any fuel injection is not carried out because the speed is Ne $\leq$ 600 rpm in this state.

If the main switch 22 is again turned on to ST position by the driver, delay period $T_D$ which corresponds to coolant temperature THW is set in a manner similar to that described above. In this delay period $T_D$, only once pre-start fuel injection is carried out. The amount of fuel injection (fuel injection time period) TAU which corresponds to coolant temperature THW is corrected in a decreasing manner in step 506 with correction coefficient K which corresponds to the value of the second counter $C_2$ indicative of number of previous starting operation. As described above, the amount of fuel injection which has been decreased in comparison to the previous amount of fuel injection before starting is supplied to the engine 1, and the starter 23 becomes to be driven after the delay period $T_D$ has been elapsed in the same manner as that described above.

Therefore, according to the embodiment described above, delay period $T_D$ which corresponds to the current coolant temperature THW is set in accordance with generation of signal indicating a command to turn on the main switch to ST position, or a command to start the engine 1 from the driver. Furthermore, during this delay period $T_D$, to be more precise, immediately after the delay period $T_D$ has been set, the amount of pre-start fuel injection corresponding to the current coolant temperature THW is supplied to the engine 1. As a result, the starter 23 is only enabled to be driven after the delay period $T_D$ has been elapsed. Therefore, the supplied fuel evaporates considerably during the delay period $T_D$ in accordance with the degree of length of the delay period $T_D$ causing relatively rich mixture which is needed for starting the engine 1 has been prepared before the engine 1 is cranked by the starter motor 23. Consequently, good starting performance of the engine 1 can be obtained. Especially, since the delay period $T_D$ is predetermined to become longer as coolant temperature THW falls, if it is in the state that the temperature of the engine 1 is low in which fuel evaporating rate is low, the relatively rich mixture which is needed by the engine 1 is necessarily generated immediately before the engine 1 is cranked by the starter motor 23. Consequently, excellent starting performance can be obtained.

Furthermore, according to the above embodiment, even if the engine 1 is maintained to be cranked exceeding a predetermined time period by the starter motor 23, electricity supply to the starter motor 23 is prevented in a forced manner causing the starter 23 to be stopped regardless of the operation of the main switch 22 carried out by the driver when start of the engine 1 has not been completed. As a result of this, excessive fuel supply to the engine 1 is prevented, whereby the state in which the engine starting is impossible because of adhesion of fuel to the spark plug 1 is prevented. Furthermore, needless electricity supply to the starter 23 is prevented, therefore, excessive consumption of electricity of the battery 21 can be prevented.

Furthermore, according to the embodiment described above, since the pre-start fuel injection amount is decreased in comparison to the previous pre-start fuel injection amount, when starter 23 is forcedly stopped, and the main switch 22 is temporarily turned off and turned on, excessive fuel supply which deteriorates the starting can be prevented.

In the embodiment described above, although delay period $T_D$ is arranged to be changed in accordance with coolant temperature THW, it may be arranged to be constant (for example, two seconds). In the above embodiment, although the delay period $T_D$ and the pre-start fuel injection amount TAU are arranged only to be changed in accordance with coolant temperature THW, the delay period $T_D$ may become longer and pre-start fuel injection amount TAU may be increased as the temperature of intake air falls because the degree of evaporation of fuel changes in accordance with intake air temperature THA.

Furthermore, although the pre-start fuel injection is limited to be conducted once, the amount of fuel injection needed for pre-start fuel injection may be supplied to the engine 1 in a divided manner into several times during the delay period $T_D$.

Still further, the pre-start fuel may be injected when the main switch is turned on to IG position and the starter motor may be disabled for a moment even if the main switch is further turned on to ST position.

The present invention may be modified in many other ways as long as the pre-start fuel is injected upon command of initiating engine operation and operation of the starter motor is enabled only after the pre-start fuel starts to vaporize.

What is claimed is:

1. A start control system for an internal combustion engine comprising:
   fuel injection means for injecting fuel into said engine when activated;
   starter means for cranking said engine when energized;
   command means for generating a command instructing initiation of operation of said engine;
   first control means for initiating activation of said fuel injection means in response to said command from said command means so that a predetermined pre-start fuel (TAU) is injected thereby, wherein said first control means determines an amount of said pre-start fuel in dependence on said temperature of said engine and decreasingly corrects said amount of pre-start fuel as a number of pre-start fuel injection previously attained increases; and
   second control means for disabling energization of said starter means until said pre-start fuel injected by said fuel injection means starts to vaporize, wherein said second control means determines a delay period ($T_D$) in dependence on a temperature (THW) of said engine in response to said command from said command means and initiates energization of said starter means when the determined delay period elapses from said command from said command means so that said pre-start fuel is taken into said engine after being vaporized during said delay period.

2. A start control system for an internal combustion engine comprising:
- a storage battery;
- a manually-operable switch for supplying, when switched on, electric power of said battery therethrough for enabling operation of said engine;
- a starter motor for cranking said engine when energized;
- a relay connected between said switch and said starter motor for energizing, when turned on, said starter motor by the electric power supplied from said switch;
- a fuel injector provided on said engine for injecting fuel when activated; and
- an electronic control unit programmed to turn off said relay in response to switch-on of said switch so that said starter motor is prevented from being energized, to activate said fuel injector thereby injecting pre-start fuel, to turn on said relay after said pre-start fuel is vaporized so that vaporized pre-start fuel is taken into said engine at the time of cranking of said engine to detect a temperature (THW) of said engine, to determine an amount of said pre-start fuel (TAU) and a delay period ($T_D$) required for vaporization of said pre-start fuel in dependence on the detected temperature, to turn on said relay after said delay period elapses relative to activation of said fuel injector, to count a number ($C_2$) of previous activations of said fuel injector, and to decrease the amount of said pre-start fuel amount as the counted number is increased.

3. A start control system according to claim 2, wherein said electronic control unit is further programmed to measure a period of time ($C_1$) in which said relay is kept turned on, and turn off said relay when the measured period of time exceeds a predetermined value ($C_0$), thereby preventing continuous energization of said starter motor.

4. A start control system for an internal combustion engine having an intake pipe connected to a plurality of cylinders through respective branched pipe portions provided downstream a throttle valve, said system comprising:
- temperature detecting means for detecting a temperature (THW) of an internal combustion engine;
- a plurality of fuel injection valves provided on said branched pipe portions for supplying fuel to respective cylinders of said internal combustion engine;
- a starter for starting said internal combustion engine;
- a power source which is electrically connected to said starter;
- switch means, provided between said starter and said power source, for controlling an electricity supply to said starter;
- start command signal detecting means for detecting a signal representing a command to start said internal combustion engine, which command is generated by a vehicle driver;
- fuel injection amount arithmetic means, coupled to said temperature detecting means and said start command signal detecting means, for calculating an amount of pre-start fuel injection (TAU) in accordance with the temperature of said internal combustion engine detected by said temperature detecting means when said start command signal is detected by said start command signal detecting means, said arithmetic means further calculating an amount of start injection and an amount of post-start injection during and after starting operation of said starter, respectively;
- switch control means for supplying said electricity supply to said switch means after a predetermined delay period ($T_D$) has elapsed from the detection of generation of said command signal by said start command signal detecting means so that said starter performs said starting operation only after said predetermined delay period; and
- fuel injection valve driving means for driving said fuel injection valves, upon detection of the generation of the command signal by said start command signal detecting means, in accordance with the calculated amount of pre-start fuel injection so that pre-start fuel is injected before starting operation of said starter, said driving means further driving said fuel injection valves in accordance with the calculated amounts of start injection and post-start injection during and after said starting operation of said starter respectively.

5. A start control system for an internal combustion engine according to claim 4, further comprising means for determining said delay time in accordance with said temperature of said internal combustion engine which is detected by said temperature detecting means, when generation of said command signal is detected by said start command signal detecting means, and wherein said arithmetic means counts a number of previous activations of said fuel injection valves and decreases the amount of said pre-start fuel injection as the counted number is increased.

6. A start control system for an internal combustion engine according to claim 5, wherein said fuel injection valve driving means is arranged to drive said fuel injection valves immediately after generation of said command signal is detected by said start command signal detecting means.

7. A start control system for an internal combustion engine having a plurality of cylinders connected through respective branched pipe portions to an intake pipe provided with a throttle valve, said system comprising:
- a plurality of fuel injection means provided on said branched pipe portions for injecting fuel when activated;
- starter means for starting said engine when energized;
- command means for generating a command instructing initiation of operation of said engine;
- injection control means for activating said fuel injection means in response to said command from said command means so that a predetermined pre-start fuel is injected before energization of said starter means, said injection control means further activating said fuel injection means during and after energization of said starter means so that start fuel and post-start fuel are injected, respectively, wherein said injection control means determines an amount of said pre-start fuel in dependence on a temperature of said engine and decreasingly corrects said amount of pre-start fuel as a number of pre-start fuel injections previously attained increases; and
- starter control means for disabling energization of said starter means until said pre-start fuel injected by said injection means starts to vaporize in said branched pipe portions.

* * * * *